(12) United States Patent
Perakis

(10) Patent No.: US 7,156,446 B2
(45) Date of Patent: Jan. 2, 2007

(54) HARD-TOP CONVERTIBLE ROOF

(76) Inventor: Petros Perakis, Kantstrasse 131, Berlin (DE)

( * ) Notice: Subject to any disclaimer, the term of this patent is extended or adjusted under 35 U.S.C. 154(b) by 227 days.

(21) Appl. No.: 10/507,526

(22) PCT Filed: Mar. 7, 2003

(86) PCT No.: PCT/DE03/00805

§ 371 (c)(1), (2), (4) Date: Sep. 10, 2004

(87) PCT Pub. No.: WO03/076222

PCT Pub. Date: Sep. 18, 2003

(65) Prior Publication Data

US 2005/0116494 A1 Jun. 2, 2005

(30) Foreign Application Priority Data

Mar. 12, 2002 (DE) .................. 102 12 573

(51) Int. Cl.
*B60J 7/04* (2006.01)
*B60J 7/20* (2006.01)

(52) U.S. Cl. .............. 296/107.2; 296/107.19; 296/107.08; 296/107.07; 296/107.03; 280/756

(58) Field of Classification Search ........... 296/107.19, 296/107.2, 107.08, 107.07, 107.03, 146.14; 280/756

See application file for complete search history.

(56) References Cited

U.S. PATENT DOCUMENTS

| | | | | |
|---|---|---|---|---|
| 1,264,804 A | * | 4/1918 | Jacobs .................. | 296/107.17 |
| 2,013,314 A | * | 9/1935 | Metz .................... | 296/107.2 |
| 2,057,907 A | * | 10/1936 | Nasarevich ............ | 296/107.2 |
| 2,191,269 A | | 2/1940 | Atwater | |
| 2,782,070 A | * | 2/1957 | Chaban ................. | 296/107.2 |
| 2,785,922 A | * | 3/1957 | Chika ................... | 296/107.2 |
| 4,543,747 A | * | 10/1985 | Kaltz et al. ........... | 49/249 |
| 4,676,524 A | * | 6/1987 | Ball et al. ............. | 280/756 |
| 5,056,857 A | * | 10/1991 | Ney et al. ............. | 296/107.2 |
| 5,078,447 A | * | 1/1992 | Klein et al. ........... | 296/107.2 |
| 5,265,930 A | * | 11/1993 | Klein et al. ........... | 296/107.17 |
| 5,558,388 A | * | 9/1996 | Furst et al. ........... | 296/107.2 |
| 5,944,378 A | * | 8/1999 | Mather et al. ......... | 296/219 |
| 6,312,042 B1 | * | 11/2001 | Halbweiss et al. ..... | 296/108 |
| 6,318,793 B1 | * | 11/2001 | Rapin et al. .......... | 296/107.17 |

(Continued)

FOREIGN PATENT DOCUMENTS

DE 36 32 058 4/1988

(Continued)

*Primary Examiner*—D. Glenn Dayoan
*Assistant Examiner*—Greg Blankenship
(74) *Attorney, Agent, or Firm*—Andrew Wilford

(57) ABSTRACT

A convertible motor vehicle first and second storage compartments extending transversely behind a seat. A rigid roof shell has two posts defining a rear opening. The first compartment extends laterally forward past the seat. Guide rails extend laterally in the first compartment forward past the seat. Respective guide slides on the rear end posts ride on the guide rails, and the roof shell is displaceable along the guide rails between an up position wholly out of the first storage compartment and a down position wholly in the first compartment with the guide slides laterally flanking the seat. A rear windshield fits in the opening between the posts. A guide in the second storage compartment displaces the rear windshield between a lowered position in the second compartment and a raised position fitting between the rear end posts of the windshield in the up position thereof and closing the rear opening.

20 Claims, 16 Drawing Sheets

U.S. PATENT DOCUMENTS

| | | | |
|---|---|---|---|
| 6,582,009 B1* | 6/2003 | Wezyk et al. | 296/180.1 |
| 6,669,201 B1* | 12/2003 | Guillez et al. | 296/220.01 |
| 6,672,658 B1* | 1/2004 | De Gaillard | 296/220.01 |
| 6,676,192 B1* | 1/2004 | Marold et al. | 296/107.19 |
| 6,808,222 B1* | 10/2004 | Quindt | 296/108 |
| 6,827,392 B1* | 12/2004 | Doncov et al. | 296/147 |
| 2004/0041434 A1* | 3/2004 | Guillez | 296/107.2 |

FOREIGN PATENT DOCUMENTS

| | | |
|---|---|---|
| DE | 43 24 708 | 1/1995 |
| DE | 44 46 799 | 6/1996 |
| DE | 102 12 573 | 10/2003 |
| EP | 261 379 | 3/1988 |
| EP | 2 681 292 | 3/1993 |

\* cited by examiner

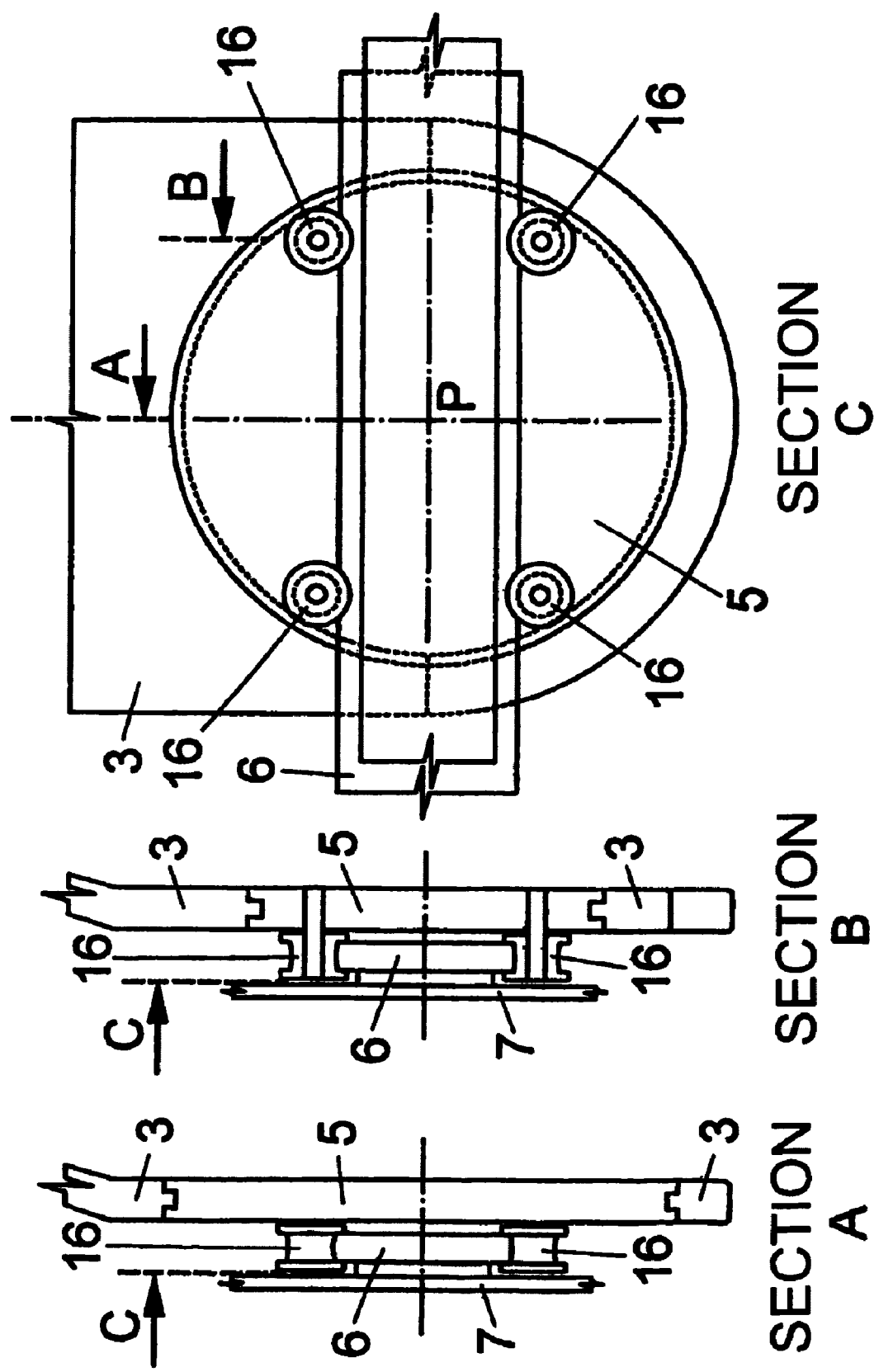

HARD-TOP CONVERTIBLE ROOF

CROSS REFERENCE TO RELATED APPLICATIONS

This application is the US national phase of PCT application PCT/DE03/00805, filed 7 Mar. 2003, published 18 Sep. 2003 as WO 03/076,222, and claiming the priority of German patent application 10242573.2 itself filed 12 Mar. 2002.

FIELD OF THE INVENTION

The invention relates to a retractable car roof, in particular a hard roof for a convertible, roadster, or the like with two or more seats, the roof having a rigid shell that has a main roof part and columns projecting fixedly downward at an obtuse angle from the rear of the main part, a rear window for a window opening, separate first and second storage compartments extending transversely of the vehicle axis immediately behind the seats and into which the main part and columns and the rear window and their guide and drive means are engageable, the main roof part with its columns being guided on a track into its storage compartment.

BACKGROUND OF THE INVENTION

German 36 342 058 and EP 0,261,379 describe a closable roof for a car having a one-piece rigid and stable roof element having when raised a generally horizontal upper roof region and side parts extending downwardly and back relative to the car and a pair of pivots on each of the two side parts or the rear of the roof that in a raised position of the roof are spaced apart somewhat below the vehicle body and that have a pair guide rails symmetrically on each of the two sides of the vehicle in which the pivots engage. The two guide rails of each pair have their upper ends spaced apart with the respective pivots and extend from there downward along similar paths so that their spacing decreases going down so as to produce an opening movement where the upper roof part is raised and then on further movement is dropped while generally vertical into its lower end position. The pivots in a first movement phase are moved in the guide rails downwardly along an arc so that the roof tips up with the upper roof part and the rear part pivots downward. The two rails that are fixed inside the car on the inside and that guide projections of the side parts via their pivots takes up quite a bit of space behind the seats and into the trunk area. Furthermore canting of the various guide elements is possible as a result of the difficult force distribution during opening and closing.

German 43 24 708 discloses a lowerable roof for cars, in particular for two-seater convertibles, having a shell forming a roof plate and rear roof posts and movable into a storage compartment between side walls of the vehicle body to which end it is oriented in a vehicle plane, forming a window opening for a rear window between a rear edge of the roof plate and the posts, and provided with guides for moving the roof plate and rear window so that the rear window can move from a lowered position relative to the roof plate into a lower position in which its edges are closely juxtaposed with the roof plate. The roof shell can drop down in lateral storage compartments via guides that are independent of the guides of the rear window and longitudinally slidable in the roof shell.

The two guide rails on the inner wall of the car that guide pivots or pine take up a great deal of space behind the seat and into the trunk area. In addition canting of the various guide elements is possible as a result of how the forces are applied during opening and closing. High surface pressures are created that make it difficult to operate the roof.

In addition German 40 38 074 describes a lowerable roof for cars, in particular a hard roof for a convertible, having roof posts to each side of a rear window of the roof that seen from the side with a storage position of the lower roof in a storage compartment in which the forward longitudinal regions of the roof form an obtuse angle underneath the roof posts and into which the roof can be lowered in which case the roof is tipped into the storage compartment. The rear window forms with the roof raised between the roof posts the rear part of the roof and can be moved from this position into a storage position in which with the roof lowered it is stowed above the lower ends of the roof posts. The roof is mounted on the motor-vehicle body by a pair of linkages that symmetrically flank the vehicle center plane and whose upper ends are pivoted at lower ends of the roof posts and that each include at least one guide link extending along an angled line to the rear window that is pivoted at its upper edge on the roof and at its lower end on the body of the vehicle. With this known solution parts of the passenger compartment are taken up by the lowering and raising process as a result of the relatively bulky linkages. The linkages are also mechanically expensive and failure-prone.

U.S. Pat. No. 2,191,269 describes a lowerable roof without rear posts for a convertible, wherein a raising and lowering mechanism formed by large and small rollers is provide that extends behind and partially below the seats. The raising and lowering mechanism is very likely to jam as a result of the roller drive and takes up all the space behind the seats.

All the known lowerable roof of the prior art achieve the required structural rigidity by being relatively massive, and are mechanically complex and expensive.

OBJECT OF THE INVENTION

It is an object of the invention, in view of this state of the art, to improve on a lowerable roof of the above-described type such that the necessary structural rigidity is achieved with less weight, easier operation, and more mechanical simplicity and usability while also taking up less space.

SUMMARY OF THE INVENTION

This object is achieved by a roof of the above-described type wherein the first storage compartment extends along an arc defined by the upward and downward travel of the roof main part and columns to a region lateral of the seats, rails extending parallel to the vehicle longitudinal axis and fixed on the vehicle body forming, inside the storage compartment and laterally adjacent the seat, guides for the columns that move along the rails via slides on ends of the columns.

The roof according to the invention is characterized in that the storage compartment for the main roof part and columns is immediately adjacent the seats, so that the columns lie laterally outside the seats. This is made possible in that the storage compartment corresponding to the movement arc has the general shape of an envelope of the main roof part and the guide rails are formed by vertical support plates fixed to the motor-vehicle body and extending parallel to the vehicle longitudinal axis. The roof according to the invention only requires two guide rails, one for each column. In this manner space and weight are spared so that room is left for another storage compartment for the rear window.

The rear window can be dropped completely down and can when the roof is lowered be raised to act as a windscreen.

The roof according to the invention has in spite of its slight mass considerable structural rigidity, and when closed provides the comfort of a permanently closed coup. It takes up little space, operates easily, is simple to operate, and does not limit rearward sight lines. The roof according to the invention can be made in a two-part arrangement whereby the front part slides over the rear part and is thus particularly suitable for a convertible with front and back seats.

BRIEF DESCRIPTION OF THE DRAWING

The invention is more closely described in the following with reference to two embodiments. Therein:

FIG. 5 is a perspective view of the vehicle with the roof up;

FIG. 7b is a further variant of the support slide with four rolls and compact construction of the lower end of the support column seen from the slide;

SPECIFIC DESCRIPTION

EXAMPLE 1

Figure 1:
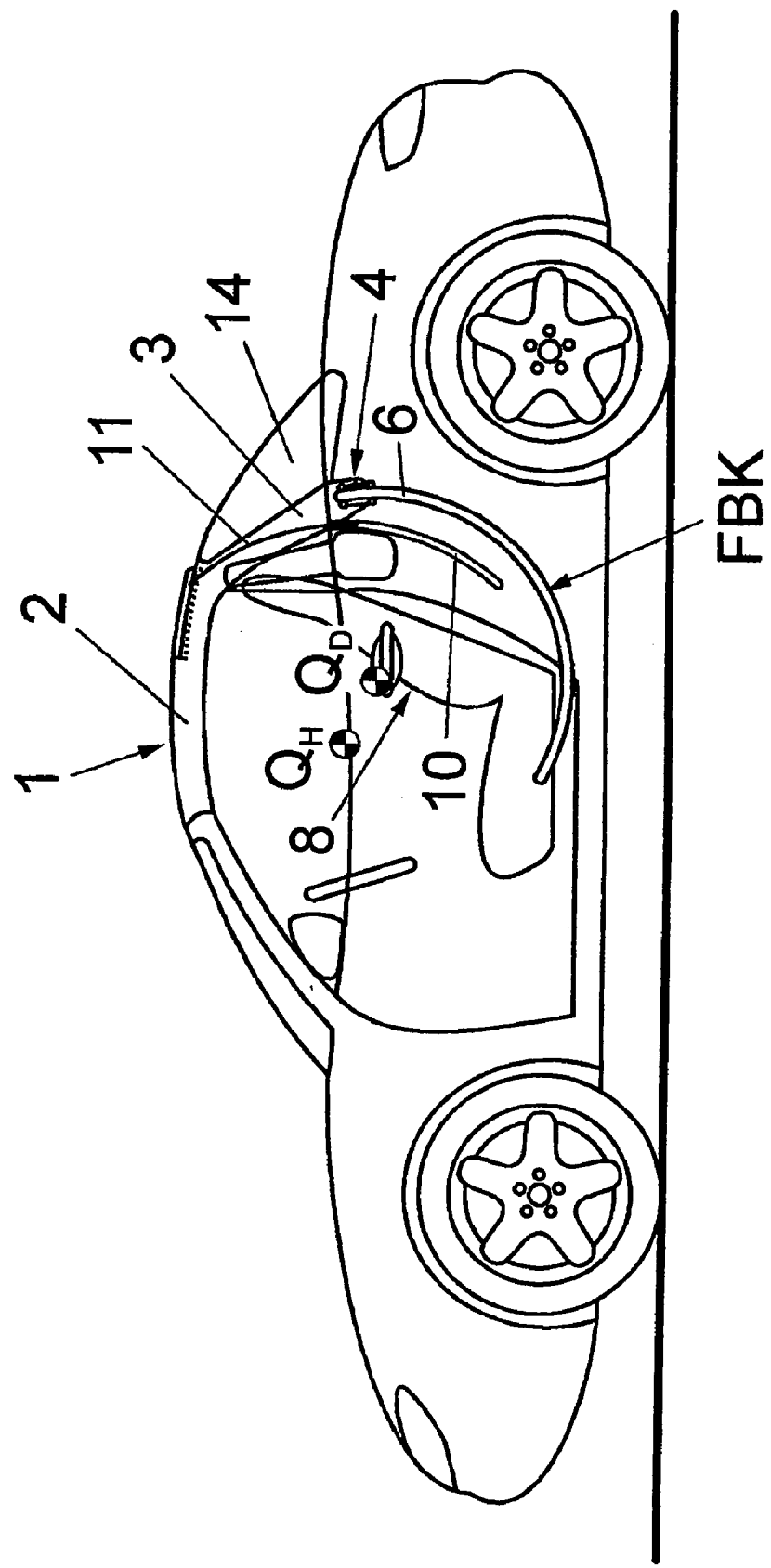
FIG. 1 is a longitudinal section through a two-seater convertible with the roof up and a circularly arcuate guide.

FIG. 1 shows a two-seater convertible having according to the invention a roof 1. It is comprised of a rigid shell forming a front main part 2 from whose rear corners two support columns 3 extend downward at an obtuse angle, diverging outwardly. The support columns 3 are narrow and flat and mainly act as supports. Lower ends 4 of these columns 3 are fixed to respective guide slides 5 that have rollers or slide pads. The guide slides 5 make four-point contact with double-T rails 6 that are fixed on support plates 7 oriented vertically and extending parallel to the vehicle longitudinal axis. Each support column 3 is guided only on one rail 6 by one guide slide 5. The rails 6 have hard surfaces so they are wear resistant.

The rails 6 extend along circularly arcuate guide paths FBK centered on a horizontal axis $Q_D$ and extend laterally outside a motor-vehicle seat 8. The two rails 6 extend into a rear storage compartment 9 positioned behind the motor-vehicle seat 8 and shaped to accommodate the movement arc of the main part 2 and the support columns 3 during lowering or raising.

Forward of the rear storage compartment 9 is a second separate front storage compartment 10 that lies immediately behind the motor-vehicle seat 8. This front storage compartment 10 serves for holding a rear window 11 that is of downwardly flaring trapezoidal shape. The rear window 11 is slightly circularly arcuate or rotation-symmetrical, centered on a horizontal transverse axis $Q_H$ of the convertible. Its concave side 12 is turned toward the motor-vehicle seat 8 and according to the invention fits around a roll-bar 13. The front storage compartment 10 for the rear window 11 also has a shape corresponding to the path of movement of the rear window 11 as it is raised and lowered. It thus is also circularly arcuate or rotation symmetrical to the transverse axis $Q_H$.

The roof 1 connects at its front edge with the upper frame of the windshield. The roof 1 is displaced by standard drives and takes place automatically.

In the raised position of the roof 1 the support columns 3 are supported by braces 14. These braces 14 can be pivoted, lowered, or rotated into the vehicle body or hinged for inward movement on the columns 3. The braces 14 optimize the aerodynamics, reducing wind resistance and wind noise and giving the roof 1 a coupe-like look.

Figure 2:
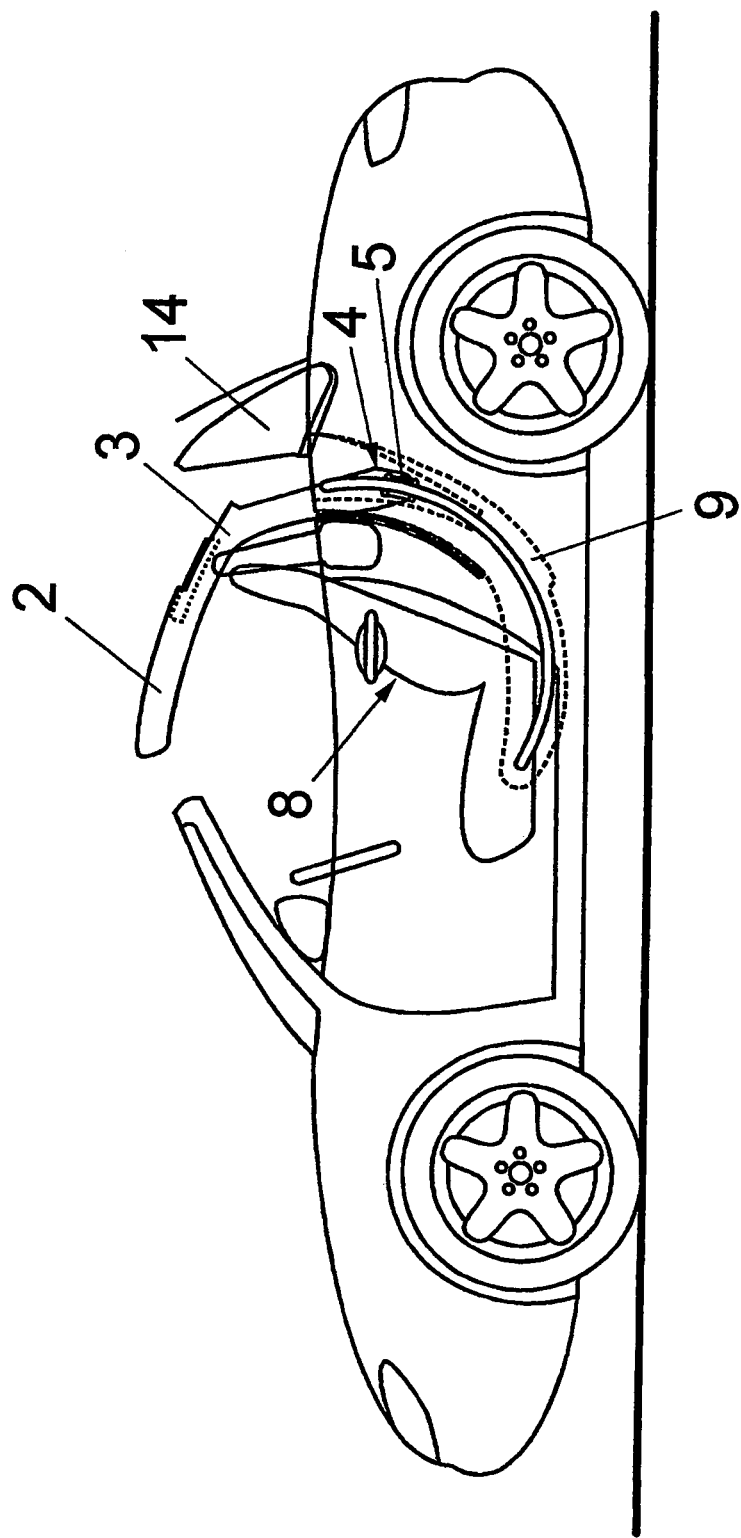
FIG. 2 is a longitudinal section through the convertible at the start of the lowering operation.

In the FIG. 2 position of the roof 1 the lowering operation of the roof 1 into the rear storage compartment 9 has started. As a result of the obtuse angle between the support columns 3 and the main part 2, the roof 1 is raised from the upper edge of the windshield. The rear window 11 in this embodiment is shown stowed down in its front storage compartment 10.

Figure 3:
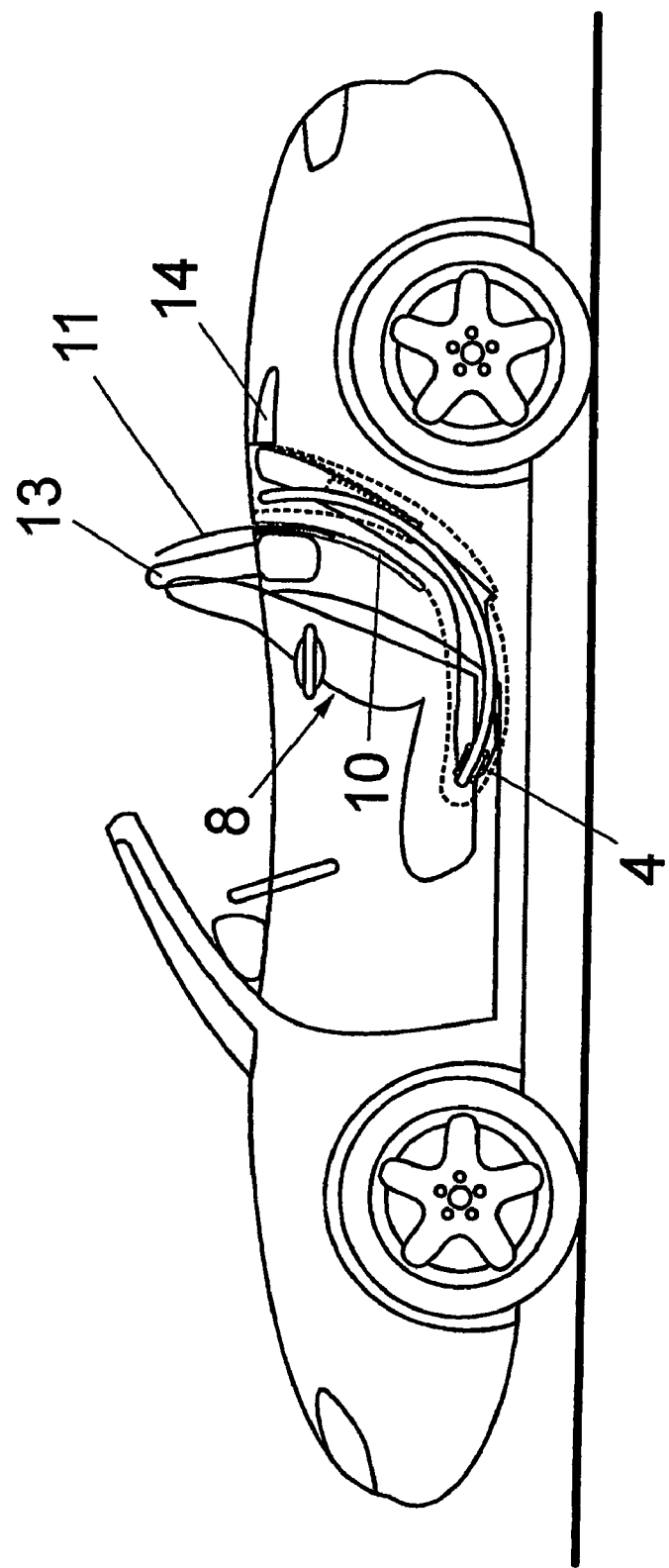
FIG. 3 is a further longitudinal section through the vehicle at the end of the lowering operation and with the rear window raised.

The main part 2 and support columns 3 move on further sinking as shown in FIG. 3 along the circularly arcuate rails 6 into their lower end position. The columns 3 are thus positioned along the rails 6 laterally of the storage compartments 9 and 10. The main part 2 lies at the end of the lowering operation generally parallel to the rear seat back of the motor-vehicle seat 8.

In order that the main part 2 leaves when lowered sufficient room for the unillustrated drive, a rear segment 15 of the main part 2 slides like a sliding roof underneath a front part of the main part 2. The retractable segment of the main part 2 and its housing are rotation-symmetrical to the horizontal transverse axis $Q_D$ so that their guide structure can be fairly light and quite compact.

Figure 4:
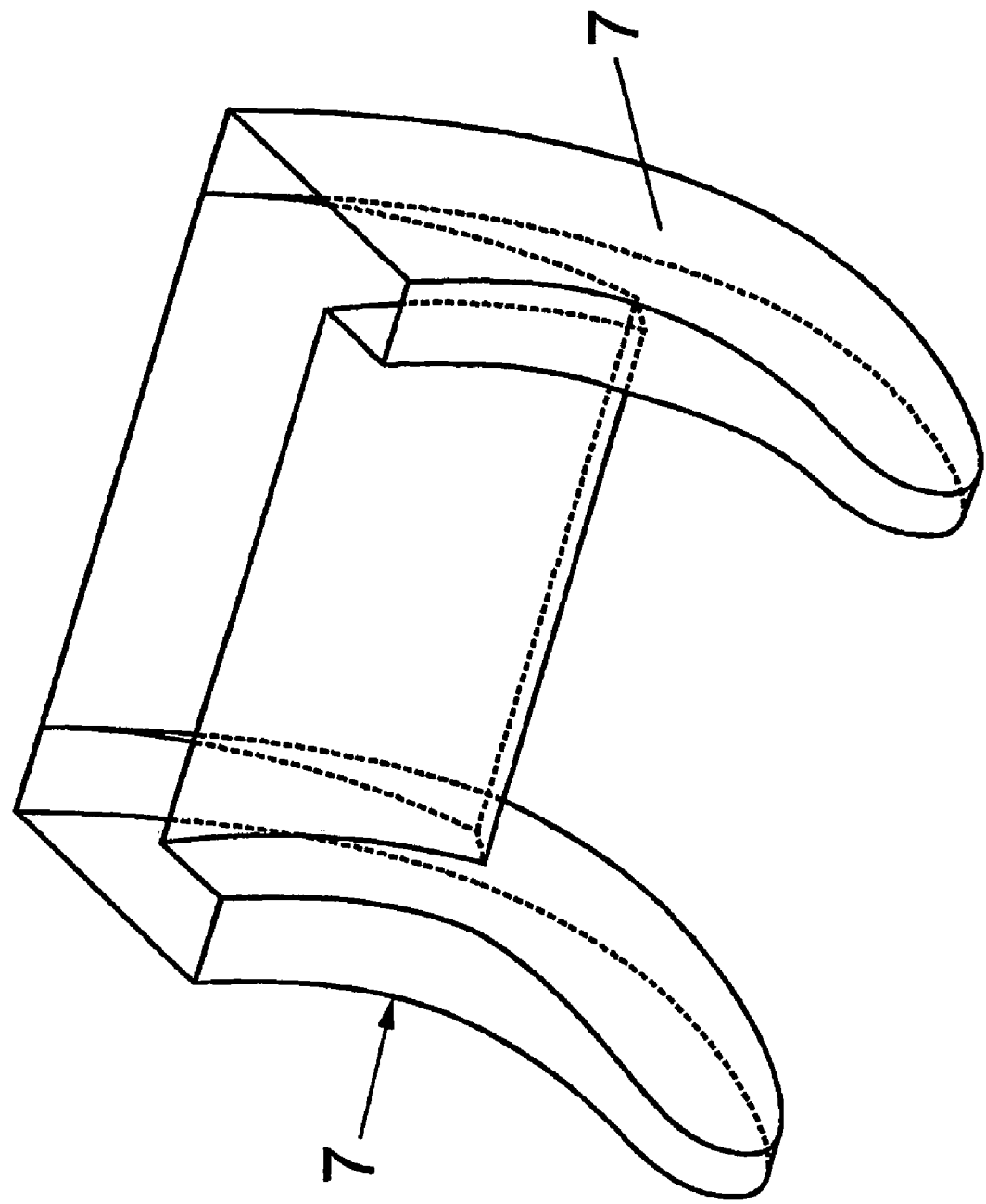
FIG. 4 is a perspective view of the roof-storage compartment.

FIG. 4 shows in perspective the rear storage compartment 9 of the roof 1. It has a central portion 23 and two side portions 24. The side portions 24 receive the columns 3 and the lateral edges of the roof shell. The central portion 23 is compact because the rear segment 15 can be retracted into the roof shell. For front-drive vehicles that do not require space for the drive shaft underneath this central portion 23, the main part 2 does not have to have a retractable segment 15.

Figure 5:
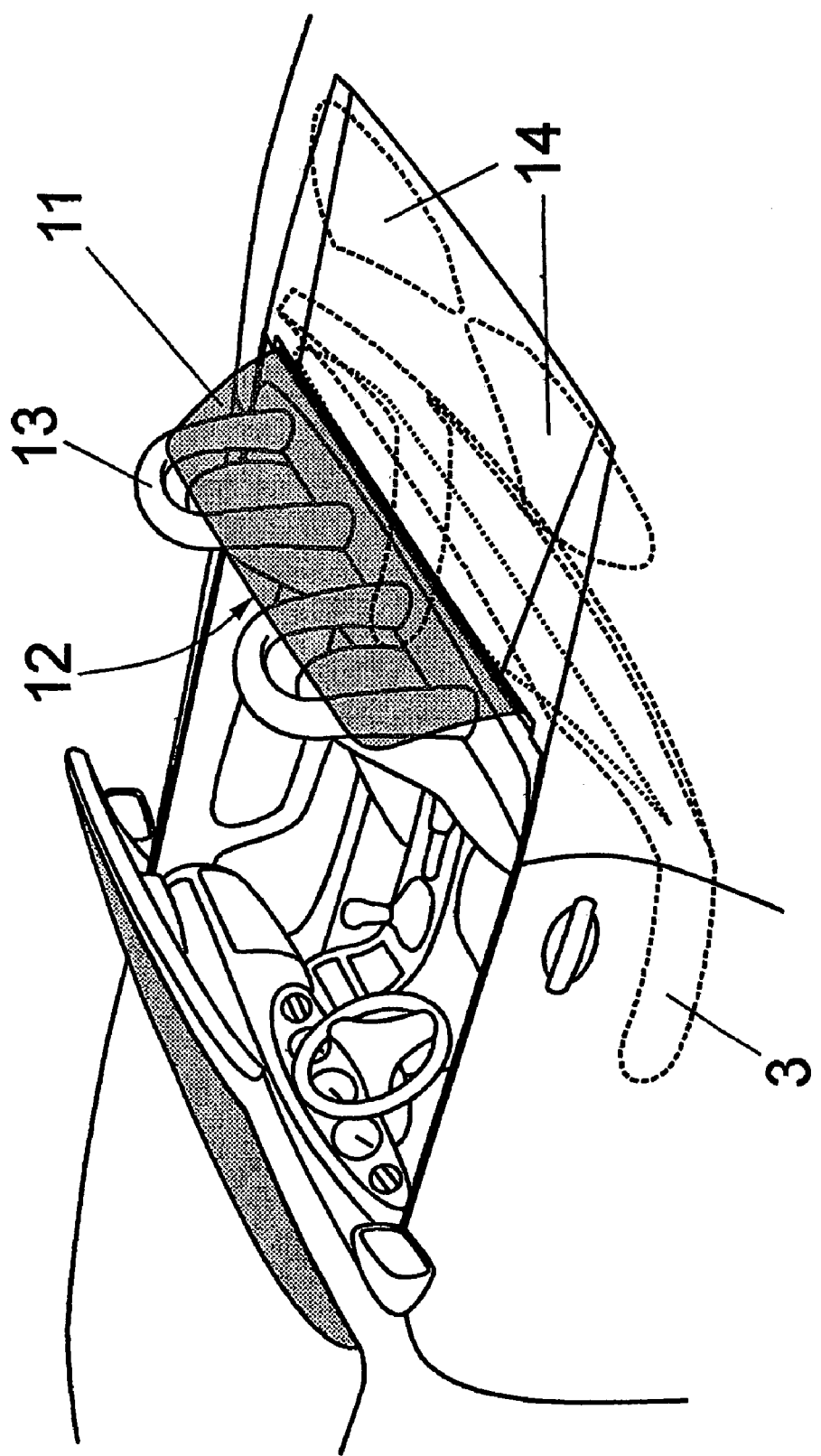
FIG. 5 is a perspective view of the vehicle with the rear window in the wind-blocking position.
Figure 6:
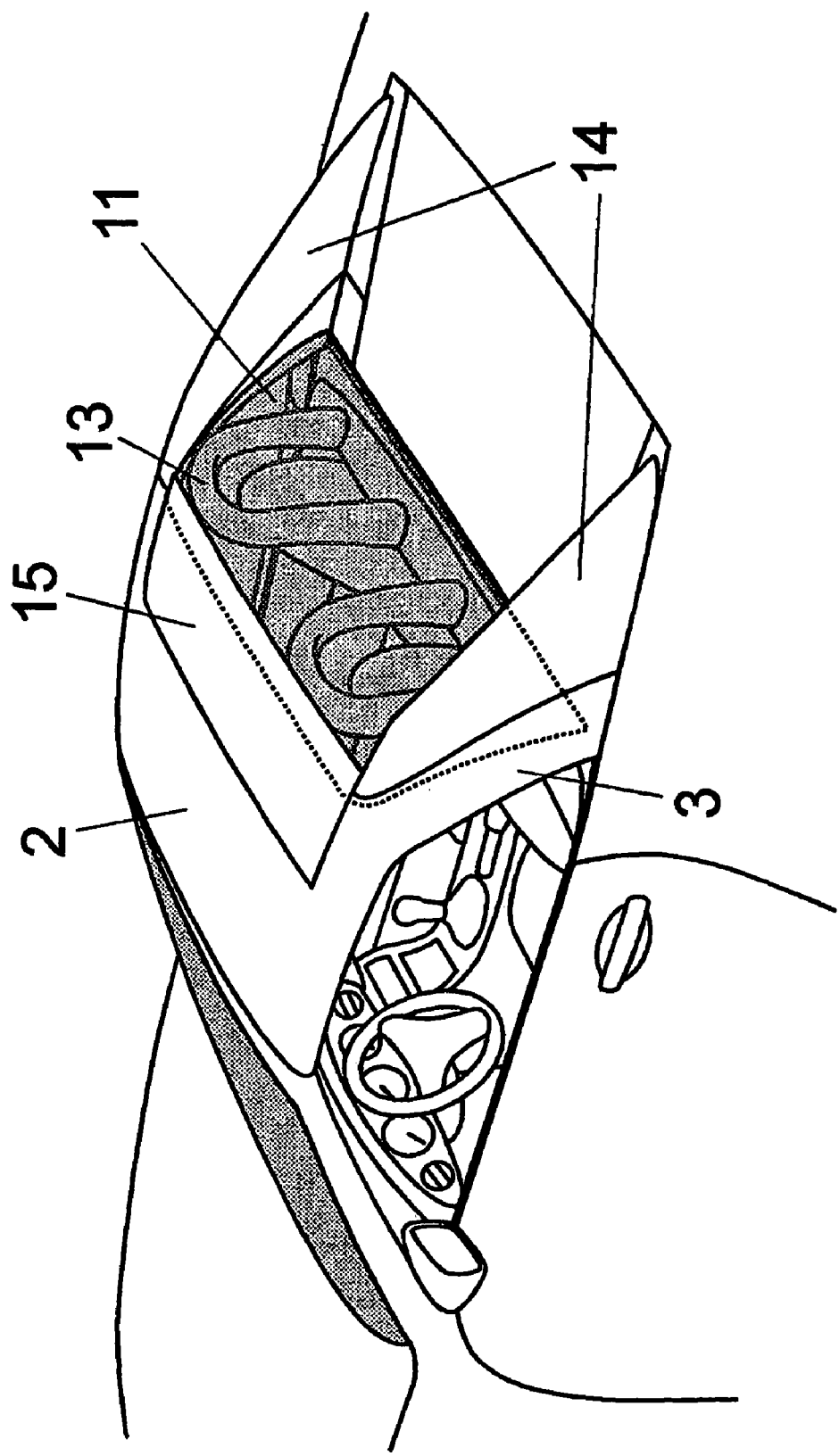
FIG. 6 is a perspective view of the vehicle with the roof down.

FIG. 5 shows the rear window 11 when raised as a windscreen. It is lowerable into the storage compartment like the side windows into the doors. When the roof 1 is closed as shown in perspective in FIG. 6 the rear window 11 bears against seal strips mounted on the vehicle body. The rear window 11 can alternatively be provided with seals.

Figure 7A:
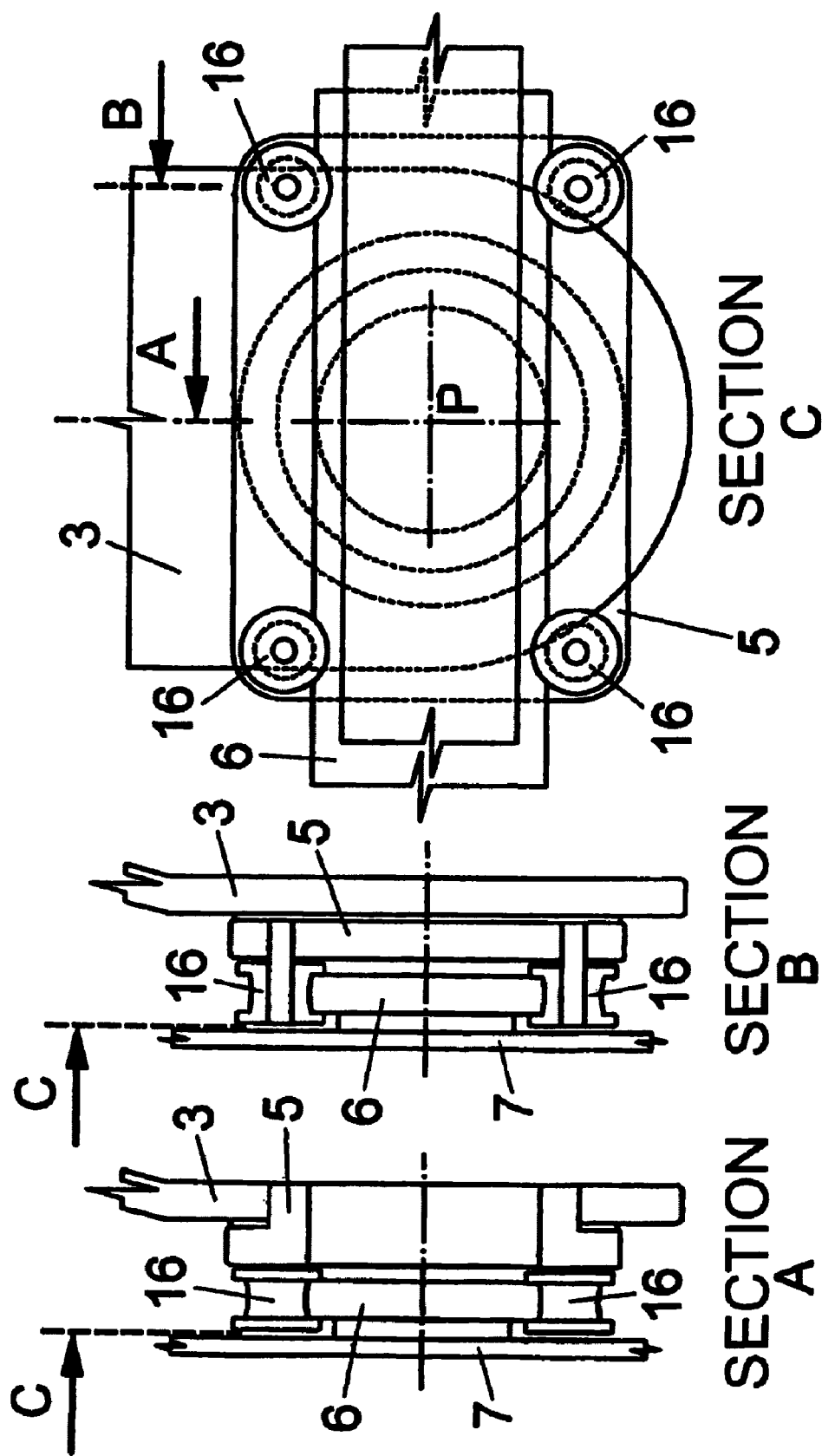
FIG. 7a is a variant of the support slide with four rolls and compact construction of the width of the lower end of the support column.

FIGS. 7a and 7b show two different embodiments of the guide slide 5. The guide slide 5 is supported by four rollers 16 on the rail 6 and is fixed at the lower end of the respective support column 3, and the slide 5 can be finely adjusted about a pivot point P. FIG. 7a shows an embodiment that makes it possible for the lower end 4 of the column 3 to be particularly compact. The guide slide 5 lies transversely inward of the support column 3. FIG. 7b shows the guide slide 5 in the same plane as the lower end 4 of the column 3, the connection of the guide slide 5 with the column 3 being very compact in the transverse direction.

Figure 8:
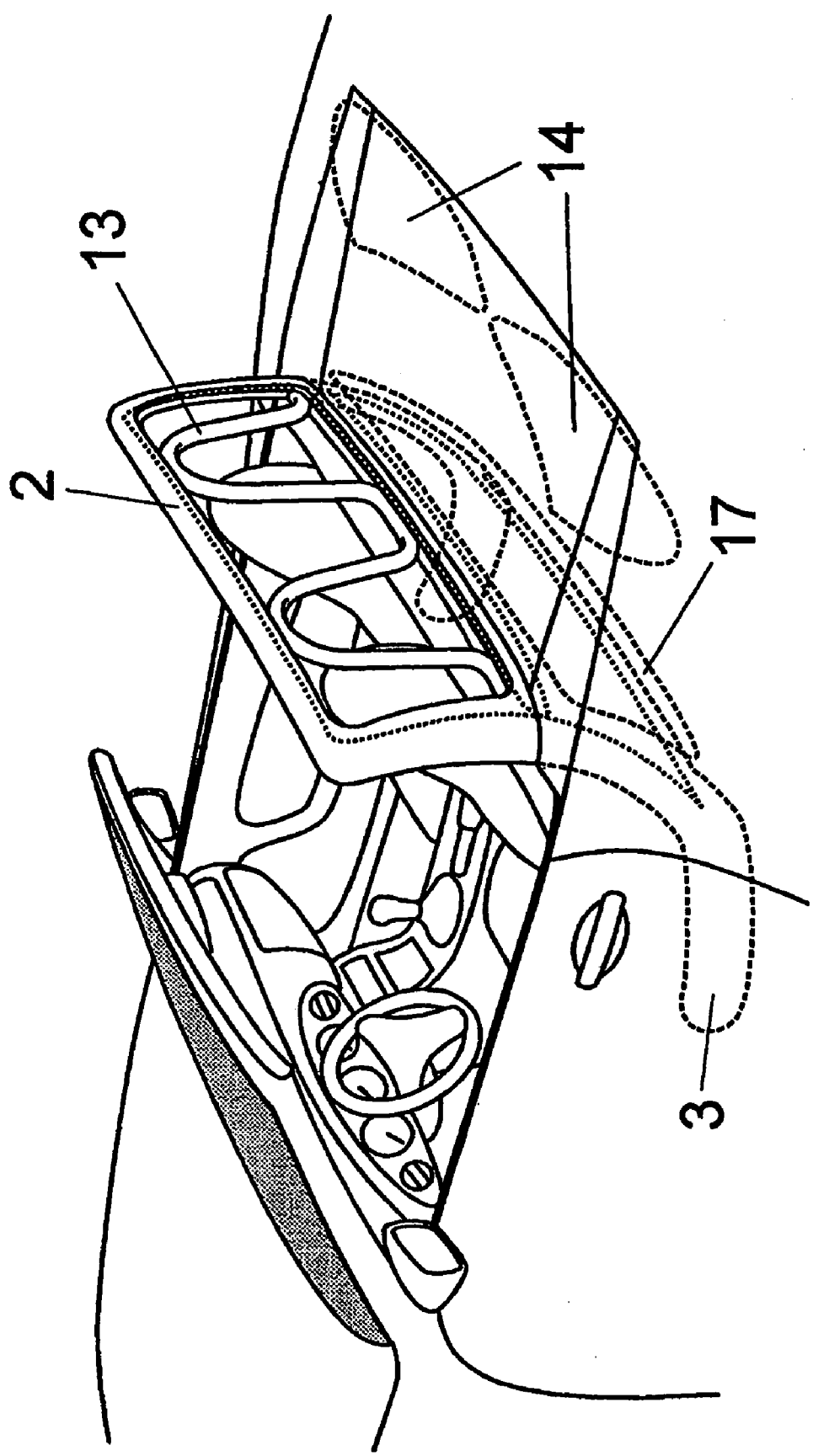
FIG. 8 is a perspective view of a vehicle with a partly down roof and a roll bar integrated into the roof.

FIG. 8 shows a further variant of example 1 wherein the roll bar 13 is retracted into the front part of the roof 1 and that projects out of the storage compartment in the down position. A cover 17 slidable over the front part of the roof is slid into the storage compartment and thus clears the view rearward. The rear window 11 is preferably guided on the roof shell and can be raised in this roof opening into a windshield position. The shape of the storage compartment for the roof 1 is so compact that there is no need for a retractable rear roof segment.

EXAMPLE 2

Figure 9:
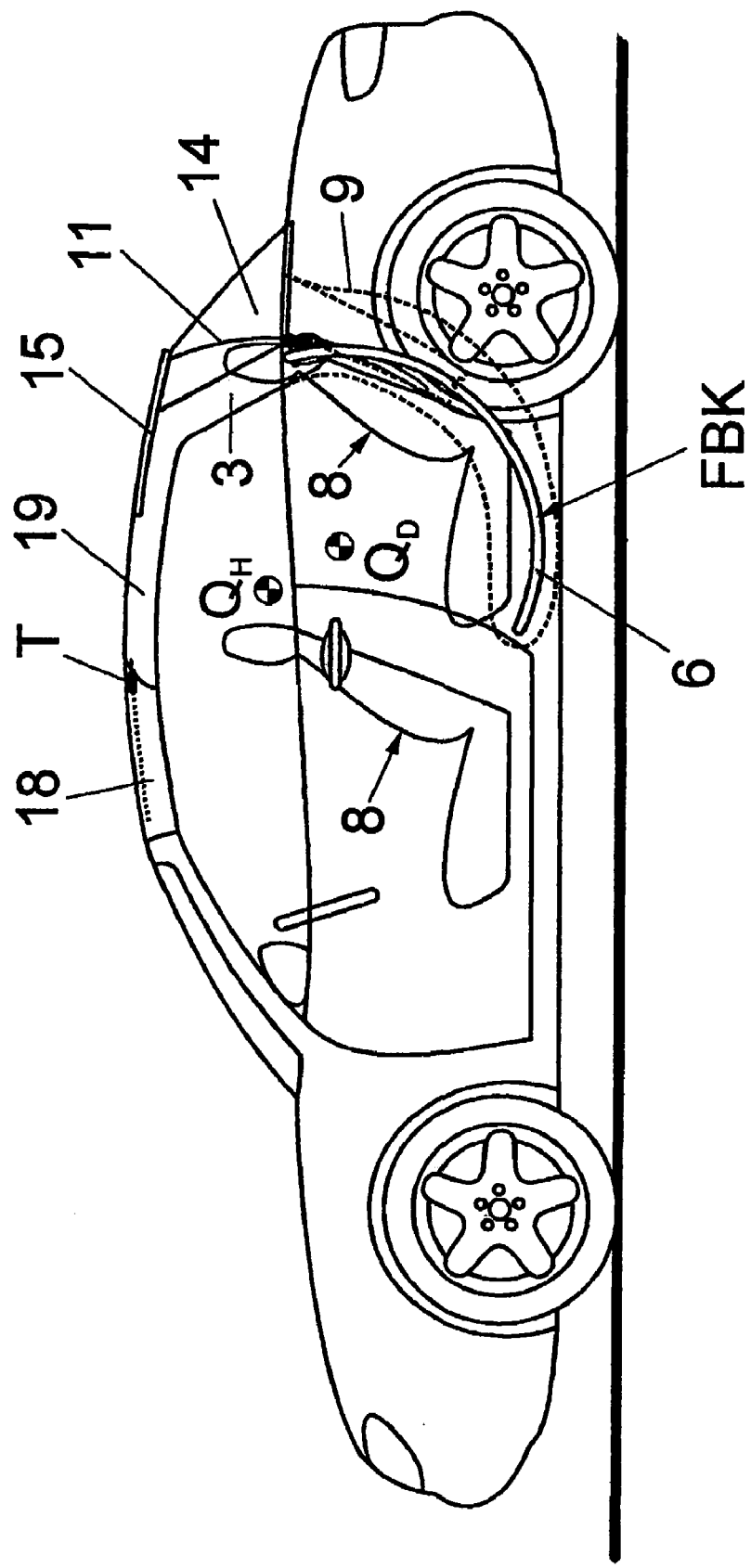
FIG. 9 is a longitudinal section through a multiple-seat convertible with a closed roof and a circularly arcuate guide.

FIG. 9 is a longitudinal section through a multiple-seat convertible wherein the main part 2 of the roof 1 is made in two pieces 18 and 19, one slidable over the other. Other than this difference, this roof 1 according to the invention is the same as example 1.

Figure 10:
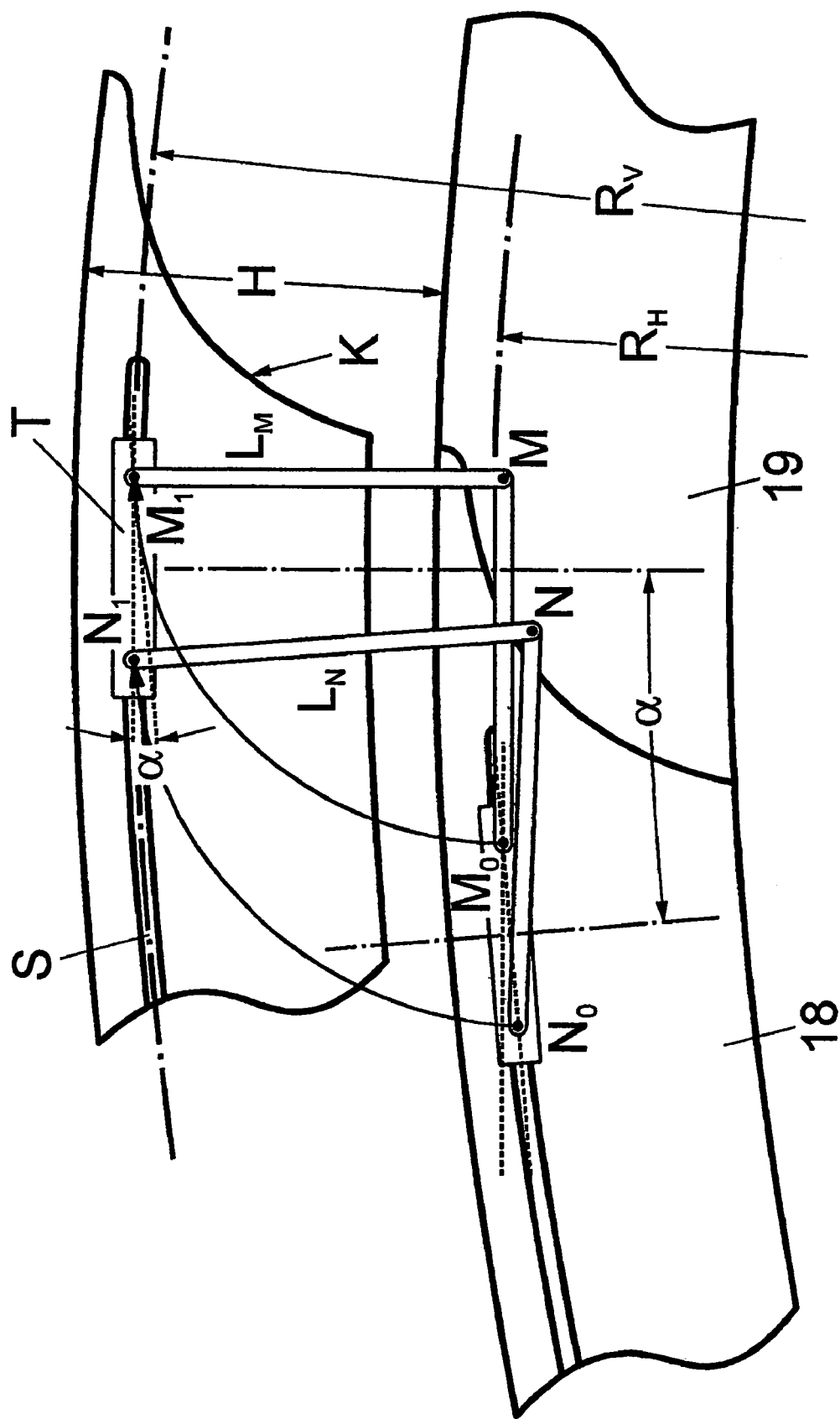
FIG. 10 is a longitudinal section through the connection between the front and back main parts of a multiple-seat convertible.

Sliding of the front roof part 18 over the rear roof part 19 takes place in two steps as shown in FIG. 10:

In the first step, links $L_N$ and $L_M$ are pivoted about their respective axes N and M such that pivot points on a slide T on the front roof part move from starting points $N_O$ and $M_O$ to end points $N_1$ and $M_1$. Due to the different lengths of the links $L_N$ and $L_M$ the roof slide T is pivoted through an angle $\alpha$.

In the second step the roof slide T moves along a guide rail S fixed in the front roof part 18 and having a radius of curvature $R_V$ until engages a front stop on the front roof part 18. In order to ensure tight fitting-together of the roof parts 18 and 19, the radius of curvature $R_V$ of the front roof part 18 is greater by the distance H than a radius of curvature $R_H$ of the rear roof part 19. The shape of complementary end edges K of the roof parts 18 and 19 follows the path of movement and ensures interfitting and disengagement purely by pivoting.

Figure 11:
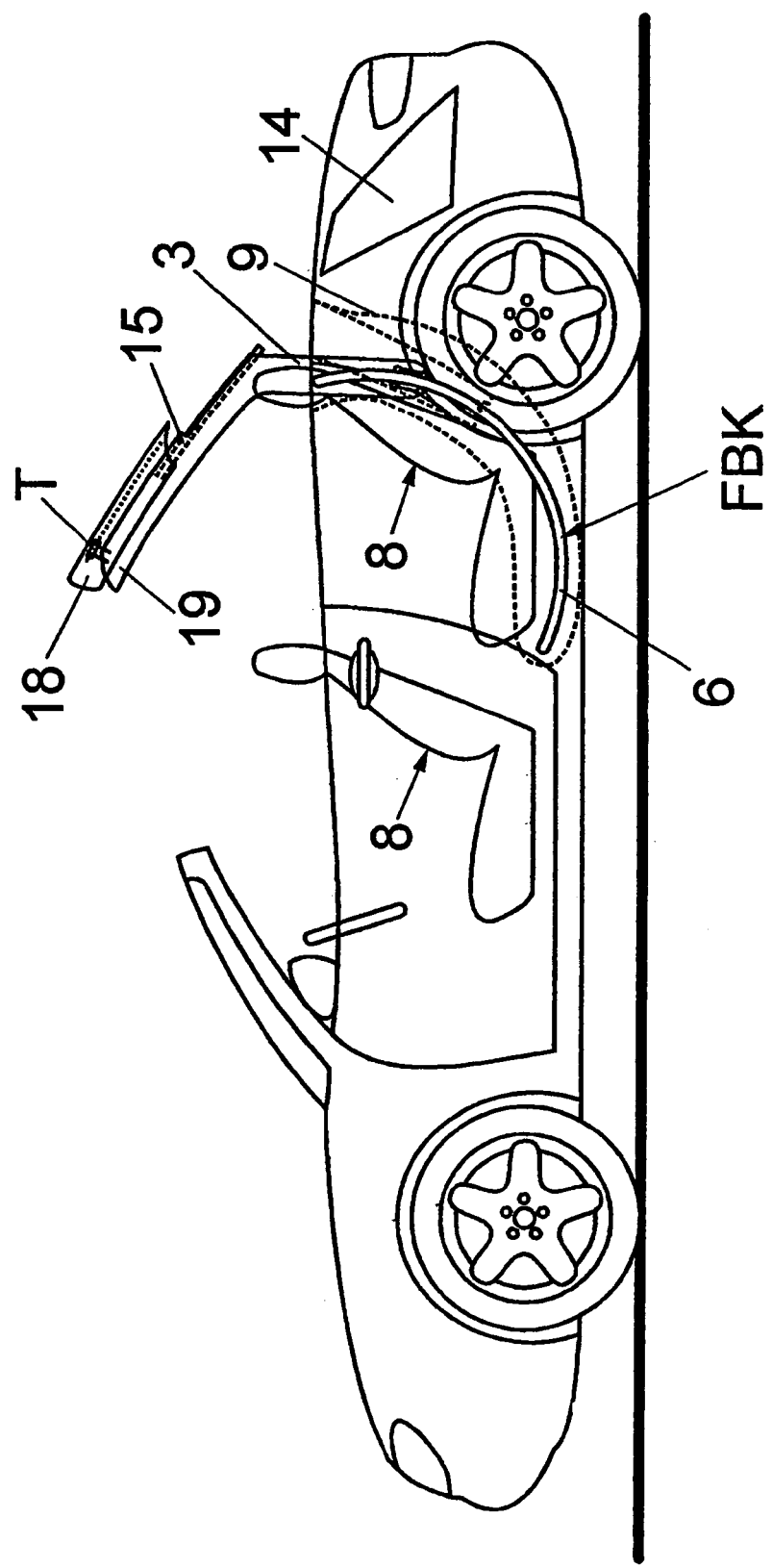
FIG. 11 is a longitudinal section through the multiple-seat convertible at the start of the lowering operation.
Figure 12:
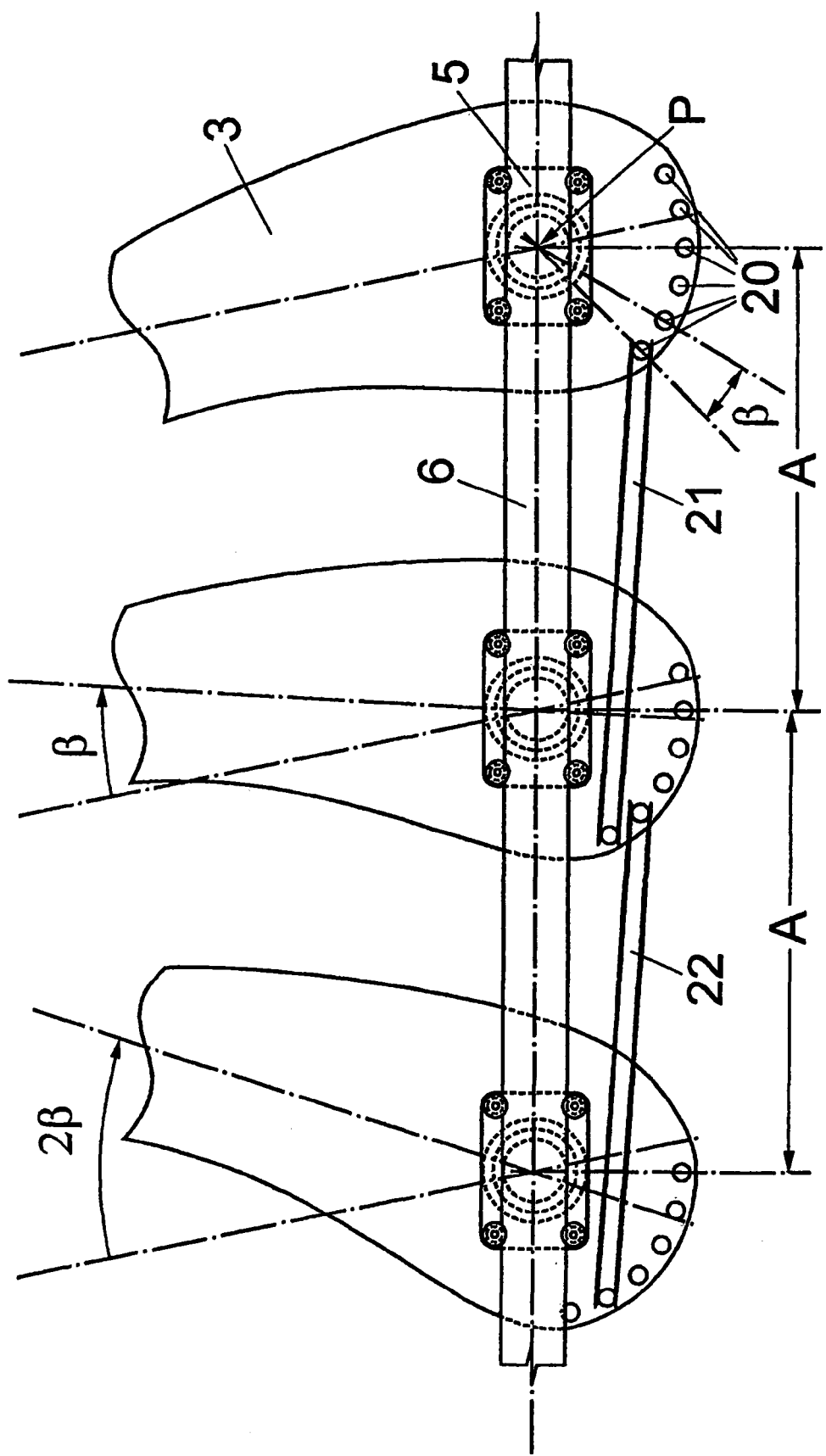
FIG. 12 is a view of the pivotal guide of the roof of the multiple-seat convertible.

FIG. 11 shows the roof 1 with its parts nested together and starting to lower. The slides 5 in this example are not fixedly mounted at the lower ends 4 of the columns 3, but are pivotal in order to allow the mechanism to fit more compactly together. On movement of the roof 1 along the guide rails 6, it turns about a horizontal transverse axis at the point P. As shown in FIG. 12 the pivoting action is controlled by pins 20 fixed on the lower end of the column 3 and engaging in guide slots 21 fixed on the support plate 7. For simplicity's sake FIG. 12 shows the arcuate travel as a straight line. The pins 20 are set on an arc having a center at P at an angular spacing of β from one another. When moving through the distance A, the guide forces the roof 1 to pivot through the angle β. Thus the one guiding pin leaves its guide slot 22 when the next enters so that the pivoting is continuous. The guide slots 21 and 22 have in this example the shape of a trochoid. Depending on the geometric parameters, the trochoid sections vary slightly from a straight line and can even be replaced by one so that manufacturing is simplified. With a circularly arcuate guide rail 6 the shape of the guide tracks 21 and 22 can be circle segments. Varying the geometric parameters produces different rotational speeds.

Figure 13:
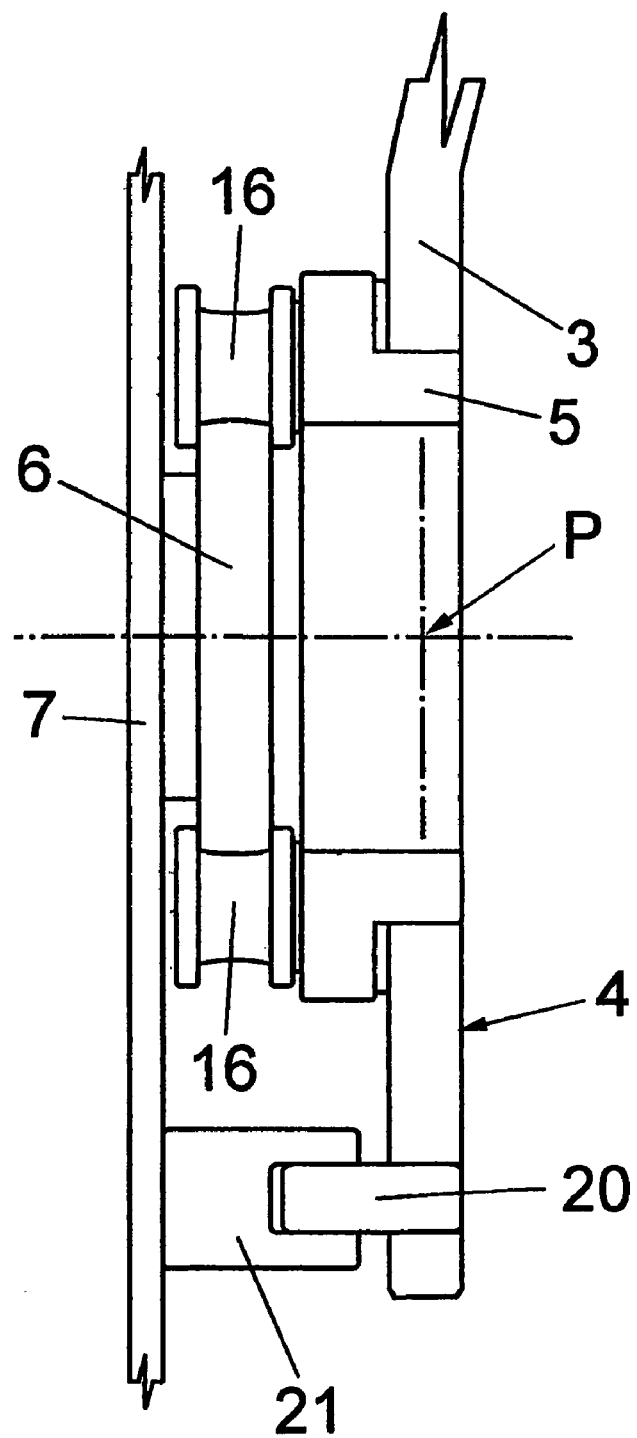
FIG. 13 is view of the support slide with pivot for the multiple-seat convertible.

Providing the pins 20 at the lower ends 4 of the columns 3 allows the guide slide 5 to be made as shown in FIG. 7a. FIG. 13 shows a guide slide that is guided by rollers 16 on the rail 6 with a pin 20 guided by a track 21.

Figure 14A:
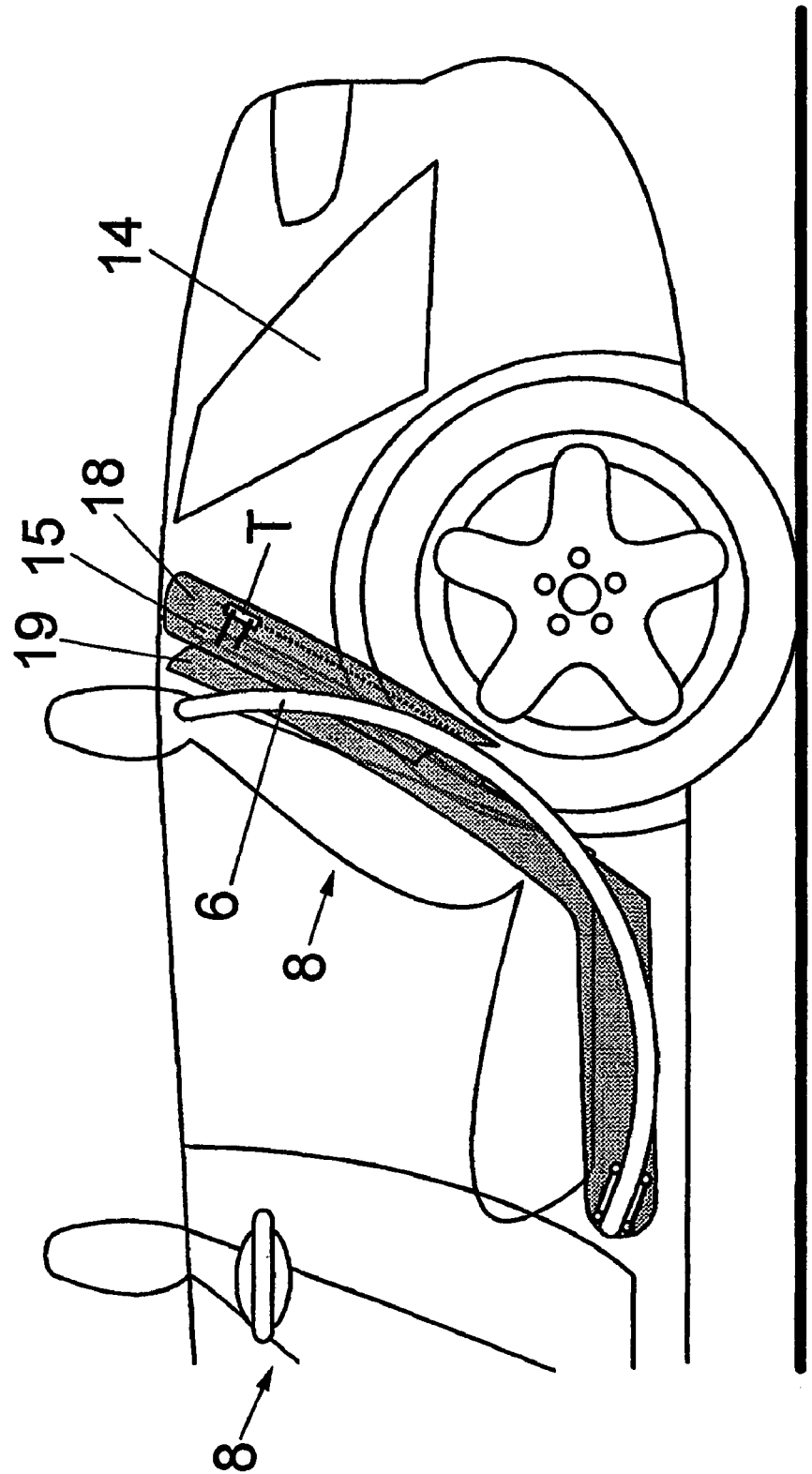
FIG. 14a is a longitudinal section through the multiple-seat vehicle with the roof down, showing the guide rail.
Figure 14B:
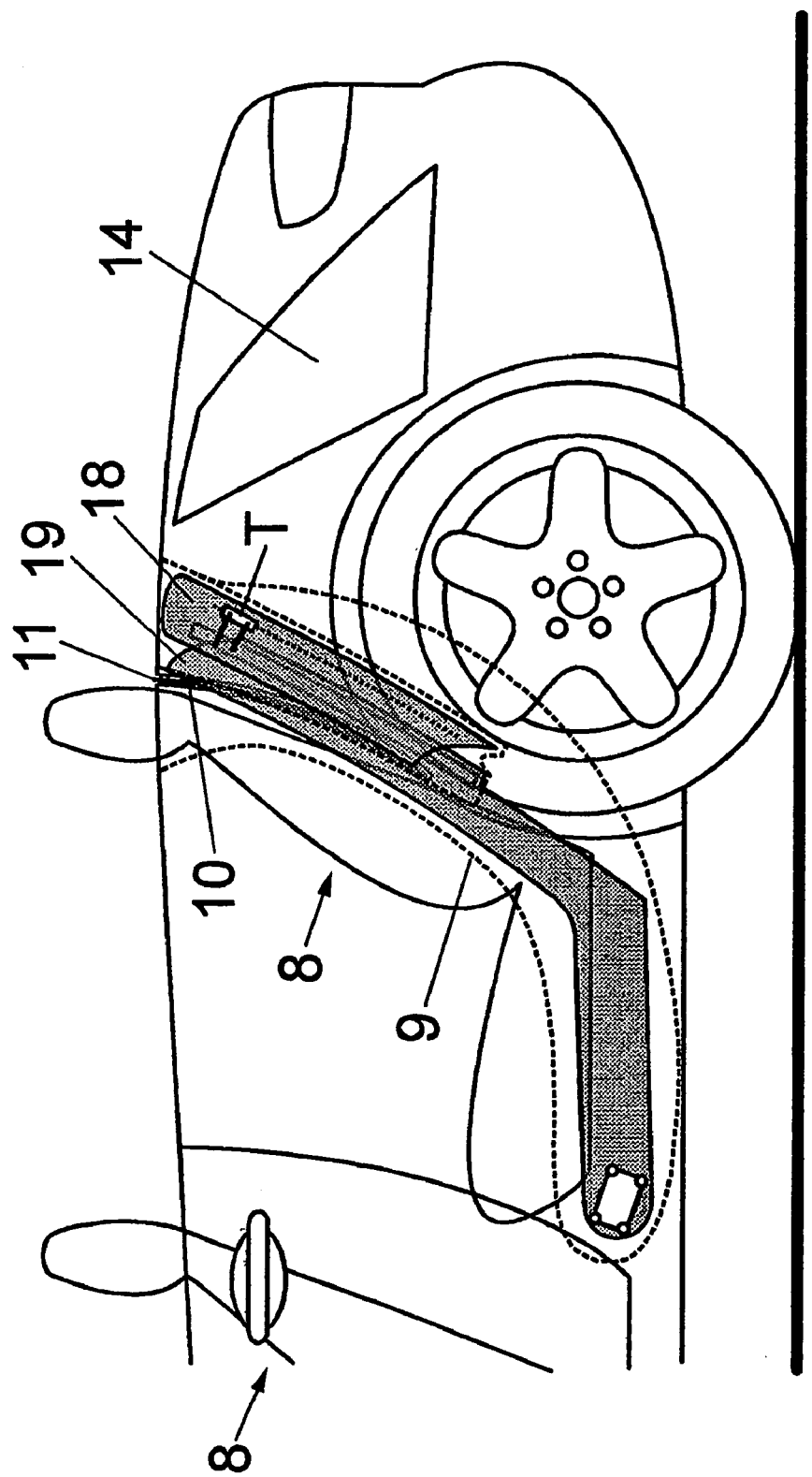
FIG. 14b is a longitudinal section through the multiple-seat vehicle with the roof down and showing the rear-window arrangement and the storage compartment for the roof.

FIGS. 14a and 14b show the roof 1 lowered into its storage compartment.

The invention claimed is:

1. In a convertible motor vehicle adapted to move in a normal travel direction and having a seat and first and second storage compartments spaced in the direction and extending transversely of the direction behind the seat, the improvement comprising:

an arcuate and rigid roof shell having two rear end posts defining a rear opening, the first compartment extending laterally of the seat in the direction forward past the seat;

guide rails extending laterally of the seat in the first compartment to each side of the seat in the direction forward past the seat;

respective guide slides on the rear end posts and riding on the guide rails, the roof shell being displaceable along the guide rails between an up position wholly out of the first storage compartment and a down position wholly in the first compartment with the guide slides laterally flanking the seat; and a rear windshield fittable in the opening between the posts; and guide means in the second storage compartment for displacement of the rear windshield between a lowered position in the second storage compartment and a raised position fitting between the rear end posts of the windshield in the up position thereof and closing the rear opening.

2. The improvement defined in claim 1 wherein the guide rails are arcuately curved.

3. The improvement defined in claim 1 wherein the posts are provided with reinforcement braces.

4. The improvement defined in claim 3 wherein the reinforcement braces are pivotal between a bracing position bearing on both the respective posts and a body of the motor vehicle and an out-of-use position not bearing on both the respective post and the vehicle body.

5. The improvement defined in claim 1, further comprising:

drive means including a motor connected to the slides for displacing the roof and posts the guide rails between the up and down positions.

6. The improvement defined in claim 1 wherein the roof shell has front and rear parts and includes means for displacement of the front part between a front position mainly forward in the direction of the rear part and a rear position with the front part vertically aligned with and stowed on the rear part.

7. The improvement defined in claim 6 wherein the front shell part includes a slide and the rear shell part includes a rail on which the slide is shiftable and a pair of arms having outer arms pivoted on the rear-shell rail and inner ends pivoted on the rear shell part.

8. The improvement defined in claim 1 wherein the rear windshield is arcuately curved and centered generally on a horizontal axis extending transversely of the direction and is forwardly concave in the raised position.

9. The improvement defined in claim 8 wherein the second storage compartment is forward of the first storage compartment relative to the direction.

10. The improvement defined in claim 1 wherein both of the compartments are arcuately curved and generally centered on a horizontal axis extending transversely of the direction.

11. The improvement defined in claim 10 wherein the second storage compartment is forward of the first storage compartment relative to the direction.

12. The improvement defined in claim 1 wherein the rear windshield is displaceable into the raised position even when the roof shell is in the down position.

13. The improvement defined in claim 1, further comprising
a compressible seal between a periphery of the rear windshield and the roof shell and posts in the raised position of the windshield and up position of the shell.

14. The improvement defined in claim 1 wherein the shell and the first compartment are arcuate and generally centered on a horizontal axis extending transversely of the direction.

15. The improvement defined in claim 7 wherein the roof shell has a front edge provided with a roll bar, the roll bar projecting upward behind the seat in the down position of the roof shell.

16. The improvement defined in claim 1 wherein the guide rails are profiled.

17. The improvement defined in claim 1 wherein the slides have rollers riding on the respective rails.

18. The improvement defined in claim 1 wherein the roof shell is pivotal on the slides.

19. The improvement defined in claim 1 wherein the rear windshield is pivotal on a body of the vehicle.

20. The improvement defined in claim 1 wherein the second compartment is provided with guide rails for the wind-shield.

* * * * *